(12) United States Patent
Bauer et al.

(10) Patent No.: US 6,385,311 B1
(45) Date of Patent: May 7, 2002

(54) REAL-TIME USAGE-BASED SPONTANEOUS SUBSCRIPTION SERVICE

(75) Inventors: Thomas Michael Bauer, Belle Mead; Christopher P Gilboy, Freehold, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/338,146

(22) Filed: Jun. 23, 1999

(51) Int. Cl.[7] .............................................. H04M 3/42
(52) U.S. Cl. ....................... 379/201.02; 379/201.05; 379/201.12; 379/207.02
(58) Field of Search ..................... 379/201.01, 201.02, 379/201.05, 201.12, 202.01, 203.01, 204.01, 205.01, 206.01, 207.02, 207.11

(56) References Cited

U.S. PATENT DOCUMENTS

| 5,483,588 A | * | 1/1996 | Eaton et al. ............. 379/204 X |
| 5,544,236 A | * | 8/1996 | Andruska et al. ............ 379/201 |
| 5,745,533 A | * | 4/1998 | Mirville et al. ......... 379/204 X |
| 6,069,941 A | * | 5/2000 | Byrd et al. .................. 379/121 |
| 6,181,787 B1 | * | 1/2001 | Malik .......................... 379/207 |
| 6,188,757 B1 | * | 2/2001 | Malik .......................... 379/207 |

OTHER PUBLICATIONS

Now allowed Serial No. 08/508143, Application Filed Jul. 27, 1995 (Byrd et al.).

* cited by examiner

Primary Examiner—Harry S. Hong
(74) Attorney, Agent, or Firm—Robert B. Levy

(57) ABSTRACT

When one party (25) to a call or connection request invokes a telecommunications service, a platform (30) monitors that request and determines whether the other parties (25) also subscribe to that service. If any party to the call does not subscribe, then the platform makes an offer of that service to each non-subscribed service. In this way, non-subscribed parties may obtain telecommunications services in a "point-of-sale" manner.

12 Claims, 2 Drawing Sheets

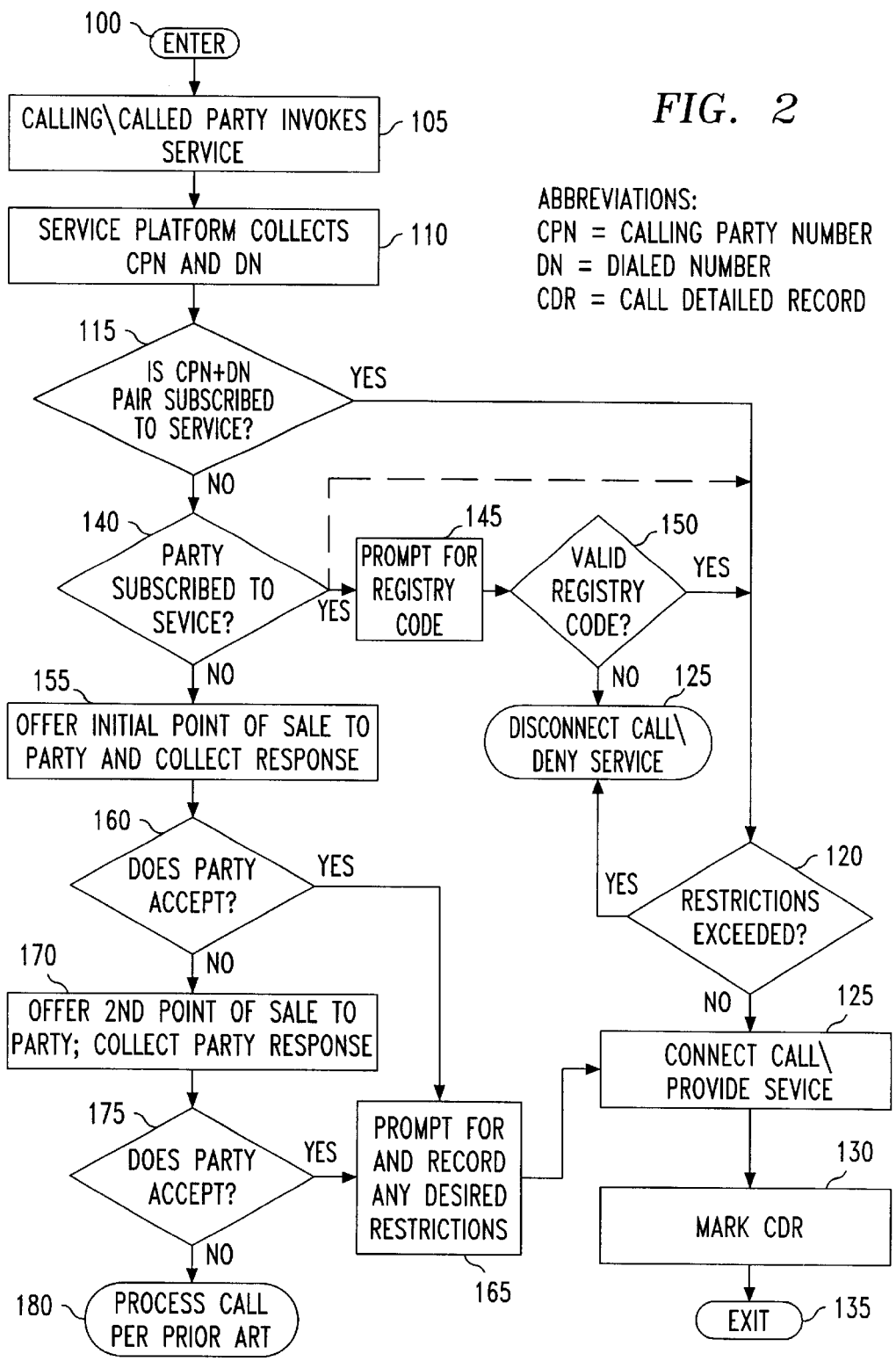

REAL-TIME USAGE-BASED SPONTANEOUS SUBSCRIPTION SERVICE

TECHNICAL FIELD

This invention relates to a technique for affording the parties to a telephone call the opportunity to subscribe on a real time basis to one or more telecommunications services.

BACKGROUND ART

Advances in telecommunications technology now allow telecommunications service providers such as AT&T to offer subscribers a rich array of telecommunications services. Most services typically require advance subscription by a subscriber. In other words, a subscriber must make a conscious decision to subscribe to a service by providing the service provider with the appropriate billing information to enable the service provider to charge the subscriber for the requested service. In many instances, the nature of the service may sufficiently interest the subscriber to take the time and effort to subscribe. However, because telecommunications service providers offer a plethora of services, many subscribers may not know all the services available to them and whether a particular service is of interest. Consequently, a telecommunications carrier may find it difficult to obtain potentially interested subscribers for particular services.

Some telecommunications service providers offer the same services on both a subscription basis and on a per-use basis. A potential candidate subscriber seeking to use such services on an ad-hoc basis does so by entering a DTMF digit or sequence of digits to select the service, whereupon the service provider provides the service and bills the subscriber accordingly. In some instances, the potential subscriber may not know that the same service obtained on an ad hoc basis is available on a subscription basis, and that such subscription may offer a cost savings based on past usage. If aware of the savings, the subscriber may likely subscribe. Further, a telecommunications subscriber may initiate a call to a called party that subscribes to a service, which, when invoked by that party during the call, may interest the calling subscriber. Unfortunately, telecommunications service providers typically do not offer any mechanism that allows such subscriber to subscribe to one or more services on an extended basis in a "point-of-sale" fashion.

Now-allowed U.S. patent application Ser. No. 08/508, 143, filed in the name of Sally Byrd et at. and assigned to AT&T, discloses a technique for controlling access to a fee-based service, such as a computer telephone support service. A subscriber seeking telephone support dials an associated telephone access number, whereupon a platform ascertains whether the subscriber is eligible (subscribed) to obtain such support. If the subscriber is eligible, the platform routes the call to provide the subscriber the desired support. If the subscriber is not eligible, the platform prompts the subscriber to enter billing information, which when validated, entitles the subscriber to receive support during the same call.

The fee-based service access control technique disclosed in the now allowed Byrd et al. advantageously allows a subscriber, if not eligible to receive support, to enroll with a service provider, and receive the desired support all during a single call. However, as with traditional service subscription methods, the Byrd et al. fee-based service access control technique requires that the subscriber "pre-establish" a relationship with the service provider. In other words, the subscriber must still call the service provider to obtain the service.

Thus, there is a need for a technique that allows providers of telecommunications services to offer subscribers the ability to subscribe to services in a point-of-sale manner without the need for the subscriber to necessarily establish a prior accounting relationship before receiving the service. In point of fact, the subscription does not constitute the ability of the caller to obtain the service, since it can still be used on a per-usage basis; but rather to establish a subscriber-specific identity and related service treatments based on the callers desire to subscribe to the offered services capabilities.

BRIEF SUMMARY OF THE INVENTION

Briefly, the invention provides a technique for offering a subscriber of telecommunications services the ability to subscribe to a service during a telephone call. In accordance with the invention, a telecommunication platform monitors a call to determine, when one or more parties to the call invokes a service or service feature, whether the other parties to that call subscribes to that service, and if not, whether to extend an offer to each unsubscribed party. To determine if the parties to the call subscribe to the invoked service, the platform consults a database containing a record of each party to the call, and the services to which that party subscribes. Upon determining that one or more parties do not subscribe and an offer is warranted, the platform extends an offer to the unsubscribed parties, as applicable. The platform may extend an offer to each unsubscribed party to obtain the service for the current call, as well as an offer for the service for all future calls. If the subscriber accepts, then the platform prompts the subscriber for any requisite information, if any, needed to offer the service on future calls. Otherwise, the call proceeds in a conventional manner taking into account the refusal of each subscriber to accept the service.

BRIEF DESCRIPTION OF THE DRAWINGS

FIG. 2 is a flow chart representation of the steps practiced by the network of FIG. 1 for providing the parties to a call or other such communications request, the opportunity to subscribe to one or more communications services in accordance with the invention.

DETAILED DESCRIPTION

Figure 1:
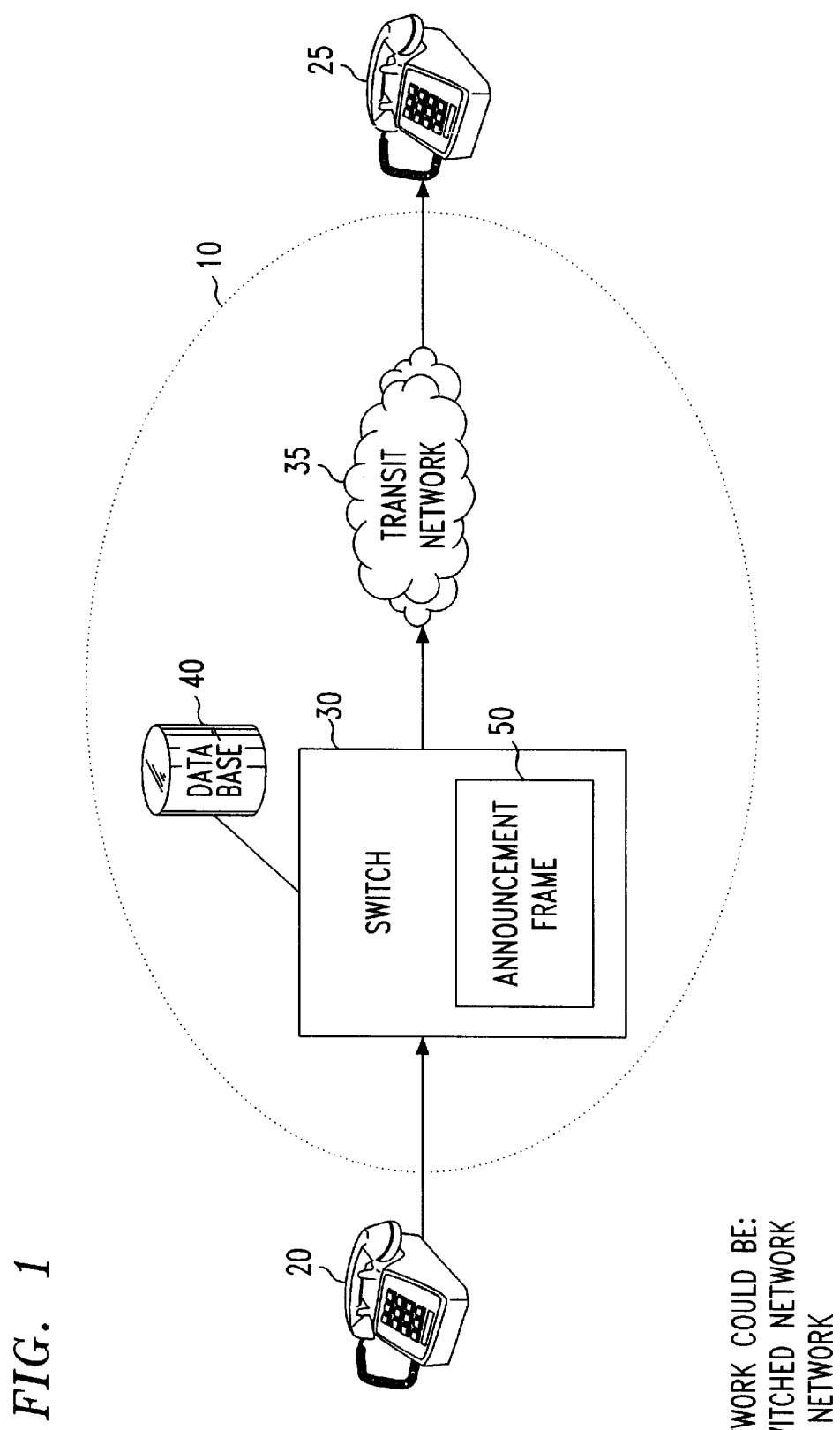
FIG. 1 discloses a block schematic diagram of a telecommunications network for providing the parties to a call or other such communications request, the opportunity to subscribe to one or more communications services on a real time basis in accordance with the invention.

FIG. 1 depicts a telecommunications network 10 for establishing a call (or other type of connection) between a calling'party, represented by terminal station 20, and a called party, represented by terminal station 25. The terminal stations 20 and 25 may comprise convention telephone sets, fax machines, computer terminals, or other types of devices which relay on an analog interface in the event the network 10 comprises a conventional Public Switched Telephone Network. Alternatively, the terminal stations 20 and 25 could comprise computers, computer terminals or other such devices having a digital interface in the event the network 10 comprises a data transmission network, such as an IP network.

To establish a call or other connection request, the calling party initiates a connection with an ingress switch 30 within the network 10. In the case of telephone call, the caller party goes off hook on their terminal station 20 and upon receipt of a dial tone, the calling party dials the telephone number associated with the terminal station 25 associated with the called party. For other types of connection requests, the called party would establish a connection through the terminal station 25 with the switch 30 (which could take the form of a router) and thereafter enter the address, such as the IP address, of the terminal set 25 of the called party. Upon receipt of the call or connection request, the switch 30 routes the call through a transit network 35 to the terminal station 25 of the called party. In the case of a telephone call, the transit network 35 may include the network of a Local Exchange Carrier (LEC) or Competitive Local Exchange Carrier (CLEC), or the a combination of the LEC or CLEC network and an Inter-Exchange Carrier (IXC) network, such as the IXC network maintained by AT&T. In the case of an IP connection request, the transit network could include a data network, or a combination of a PSTN and data network.

In some instances, the calling and/or called parties may wish to invoke one or more special services in connection with the call or communications request. For example, the calling party placing a telephone call from his or her terminal station 20 may invoke one or more services by initially dialing an access number associated with a platform providing the service. The platform may comprise part of the switch 30 a separate entity (not shown) connected to the switch. For ease of discussion, the platform resides within the switch 30. Rather than invoke the service by initially dialing the access number of the platform, the calling party could invoke a service by initially dialing the number of the called party, and then entering one or more DTMF signals. In response, the switch 30 would provide or invoke the service, either directly, or by establishing a link, typically a signaling link (not shown) to another network element that would provide the service. In response to the service request, the switch 30 would typically, although not necessarily consult a database 40 that contains records regarding the calling party's status. By consulting the database 40, the switch 30 would validate the calling party's request for the desired service, and provide the calling party with the service. In connection with providing the service, the switch 30 would provide any needed announcements via an announcement frame 50.

Traditionally, if the calling party invoked a particular service also available to the called party, no opportunity was afforded to the called party to subscribe to that service or other services during the call or connection request. Similarly, if the called party invoked a service available but not subscribed to by the calling party, no opportunity was afforded to the calling party to subscribe to that service or related services during the call or other connection request. As a consequence, the communications carrier(s) carrying the call missed the opportunity to provide such services and garner additional revenues.

The present invention overcomes this disadvantage by providing a method for offering the parties to a call or other connection request the opportunity to subscribe to one or more services in the course of the call without the need for the party accepting the service offering to pre-establish a relationship with the service provider. Thus, the method of the invention affords the parties the opportunity to subscribe to such services in a "point-of sale" manner. Referring to in FIG. 2, the method of the invention commences upon execution of step 100, whereupon the network 10 awaits a call or connection request. In connection with a call or connection request, the calling or called party or both of them may invoke one or more services (step 105). As discussed above, the calling party could invoke a service, either by initially entering the access number or address of the platform, or by entering DTMF signals, or other data, after entry of the telephone number or address of the called party. Alternatively, if the calling party didn't initially invoke the service, but rather simply initiated an ordinary call or connection request, the called party could invoke a service by entering a one or more DTMF signals or other commands during the call or connection request. Either the platform coterminous switch 30, or another platform within a switch (not shown) serving the called party, would detect the DTMF signals.

In response to a request to invoke the service, the platform collects the calling party's number (CPN) and the dialed number (DN) of the called party (step 110). Thereafter, the platform checks whether the CPN and DN pair both subscribe to the invoked service (step 115) by querying the database 40 of FIG. 1 or another such database containing the records of parties subscribing to the service. If both the calling party and the called party subscribe to the service, then the platform executes step 120 and checks whether any restrictions associated with the service are exceeded. If so, the platform denies service (step 125), and depending on the manner in which party invoked the service such as by initially dialing the platform, the platform may disconnect the call. However, if the calling party invoked service by dialing the number of the called party directly and thereafter entering one or more DTMF digits, the platform would deny service, but would not necessarily disconnect the call. If service restrictions are not exceeded, the platform connects the call to the called party (if not already connected) and provides the requested service (step 125). The platform thereafter marks a call detail record (CDR) for billing purposes (step 130) before exiting the process (step 135).

If during step 11 5, the platform determines that the CPN and DN pair is not subscribed to the requested service, then the platform determines which of the parties is subscribed to the service (step 140). After identifying the subscribed party and where the subscribed service requires a registry code, the platform prompts the subscribed party for a valid registry code (password or PIN) during step 145 and thereafter checks the validity of the caller-entered registry code (step 150). If the caller-entered registry code is valid, program execution branches to step 120, otherwise, program execution branches to step 125. The particular service invoked by the subscribed party may not necessarily require entry of a registry code during step 145 and validation of that code during step 150. Thus, for services not requiring these steps, program execution may branch from step 140 directly to step 120, as indicated by the dashed line in FIG. 2.

In addition to providing the subscribing party with access to the subscribed service, the platform will make an offer of the service during step 155 to the party found not to subscribe during 140. In other words, during step 155, the platform will make an announcement to each non-subscribed party to the call or connection request offering the service in a "point-of-sale" fashion such that the non-subscribed party can enroll without the need for any pre-established relationship. In the preferred embodiment, the platform initially offers the service to the non-subscribed party for the present call or connection request for the current call or connection request and collects that party's response during step 155. Thereafter, the platform checks whether the party accepted the offer (step 160). and if so, then prompts the party information in connection with the offered service, including, but not necessarily limited to, any desired restrictions, and thereafter records that information (step 165), before branching to step 125.

If, during step 160 the platform learns that the non-subscribed party did not accept, then the platform makes a second offer of the service for all calls on a going forward basis, and after making the offer, then collects the party's response (step 175). Thereafter, the platform checks whether the party accepted this offer during step 175, and if so, then branches to step 165. Otherwise, when the party does not accept, the call is processed in a conventional manner.

The foregoing discloses a method for offering the calling and called parties to a call the opportunity to subscribe to one or more services if they do not already subscribe.

The above-described embodiments merely illustrate the principles of the invention. Those skilled in the art may make various modifications and changes that will embody the principles of the invention and fall within the spirit and scope thereof. For example, while the preferred embodiment discloses a pair of callers, the present invention can easily operate to offer service to multiple parties on a single call. Moreover, rather than offer a single service for subscription, the method can easily offer multiple services.

What is claimed is:

1. A method of offering parties to a call or connection request the ability to subscribe to at least one telecommunications service during the call or connection request, comprising the steps of:

monitoring the call or connection request to determine if a party has invoked a service, and if so, checking whether all of the other parties to the call or connection request are subscribed to that service by querying a database using a telephone number associated with said each other party to locate a service record associated with that party, but if any other party is not subscribed to that service;

offering each non-subscribed party the opportunity to obtain said at least one service and for each non-subscribed party accepting the offer, providing said at least one requested service.

2. The method according to claim 1 wherein each non-subscribed party is offered the opportunity to obtain said at least one service for the duration of the call or connection request.

3. The method according to claim 1 wherein each non-subscribed party is offered the opportunity to obtain said at least one service on a going forward-basis for subsequent of the calls or connection requests.

4. The method according to claim 1 including the step of processing the call or connection request in an ordinary fashion once after each non-subscribed party has been offered the opportunity to subscribe to said at least one service.

5. The method according to claim 1 wherein the step of monitoring the call or connection request includes the step of checking whether a party initiating the call or connection request has initially sought a connection with a platform offering said at least one service.

6. The method according to claim 1 where the step of monitoring the call or connection request includes the step of detecting the entry by said one party of a command after initiation of the call or connection request.

7. A method of offering each called party the ability to subscribe to at least one telecommunications service during the call or connection request, comprising the steps of:

monitoring the call or connection request to determine if a calling party initiating a call or connection request has invoked a service, and if so, checking whether each called party is subscribed to that service by querying a database using a called party number associated with said each called party to locate a service record associated with that party, but if any called party is not subscribed to that service;

offering each non-subscribed called party the opportunity to obtain said at least one service and for each non-subscribed called party accepting the offer, providing said at least one requested service.

8. The method according to claim 7 wherein each non-subscribed called party is offered the opportunity to obtain said at least one service for the duration of the call or connection request.

9. The method according to claim 7 wherein each non-subscribed called party is offered the opportunity to obtain said at least one service on a going forwardbasis for subsequent of the calls or connection requests.

10. The method according to claim 7 including the step of processing the call or connection request in an ordinary fashion once after each non-subscribed called party has been offered the opportunity to subscribe to said at least one service.

11. The method according to claim 7 wherein the step of monitoring the call or connection request includes the step of checking whether a party initiating the call or connection request has initially sought a connection with a platform offering said at least one service.

12. The method according to claim 7 where the step of monitoring the call or connection request includes the step of detecting the entry by said calling party of a command after initiation of the call or connection request.

* * * * *